Patented July 5, 1949

2,474,823

UNITED STATES PATENT OFFICE 2,474,823

QUINOLINE COMPOUNDS AND PROCESS OF MAKING SAME

Joseph H. Burckhalter, Detroit, Eldon M. Jones and Albert L. Rawlins, Grosse Pointe Woods, Frank H. Tendick, Grosse Pointe Park, and Walter F. Holcomb, Detroit, Mich., assignors to Parke, Davis & Company, Detroit, Mich., a corporation of Michigan No Drawing. Application November 5, 1945, Serial No. 626,908

15 Claims. (Cl. 260—286)

This invention relates to certain new and useful quinoline compounds and to methods for obtaining the same. More particularly, the invention relates to quinoline compounds having the formula,

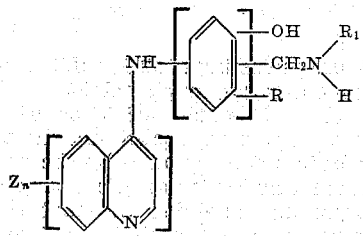

where Z is hydrogen, halogen, —COOH, —COO (lower alkyl), —OH, lower alkyl or lower alkoxy, $n$ is one of the integers one, two, and three, R is hydrogen, halogen, —OH, lower alkylene or lower alkyl and $R_1$ is hydrogen, an alkyl or alkylene radical containing 1 to 10 carbon atoms inclusive or a cyclohexyl radical.

These new compounds are useful therapeutic agents and, in general, they are characterized by their toxicity to plasmodia. These compounds may be used either in the form of their bases or their salts with organic or inorganic acids such as hydrochloric acid, sulfuric acid, phosphoric acid, sulfamic acid, acetic acid, lactic acid, tartaric acid, gluconic acid, citric acid and alkyl sulfonic acids or as the insoluble salt of methylene disalicylic acid.

This application is a continuation-in-part of our copending application, Serial No. 539,990, filed June 12, 1944, now U. S. Patent No. 2,428,355, issued Oct. 7, 1947.

The compounds of the present invention may be prepared by the reaction of a substituted aminophenol of the formula,

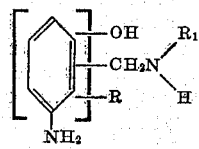

with a 4-haloquinoline compound of the formula,

where Z, $n$, R and $R_1$ have the same significance as given above and X is a chlorine or bromine atom.

The reaction may be carried out by reacting approximately equimolar quantities of the 4-haloquinoline and the substituted aminophenol in a suitable solvent. Such solvents are, in general, water, water-miscible organic solvents and water, water-miscible organic solvent mixtures. Some of the water-miscible solvents which we may use are low molecular weight alcohols such as methanol, ethanol and n-propanol, low molecular weight ketones such as acetone and methyl ethyl ketone, and ethers such as dioxane and ethylene glycol monoethyl ether.

We prefer to carry out the above reaction in the presence of an acidic catalyst. Such catalysts are dilute and concentrated organic acids and dilute and concentrated inorganic acids. Some of the organic acids which we may use are acetic, propionic, butyric and the like acids. When the reaction is carried out in the presence of a concentrated organic acid, the acid serves both as the catalyst and as the solvent. The inorganic acids which we use are, in general, mineral acids such as hydrochloric, hydrobromic, sulfuric, phosphoric and like acids.

A modification of our process for obtaining these new compounds involves the use of an N-acyl derivative of the substituted aminophenol. In this modification the acyl derivative is hydrolyzed to the aromatic amine under acidic conditions and the amine so formed caused to react simultaneously or subsequently with the 4-haloquinoline compound. This is illustrated by the following two equations employing the acetyl derivative of the substituted aminophenol.

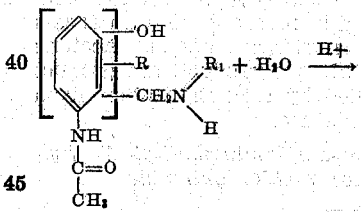

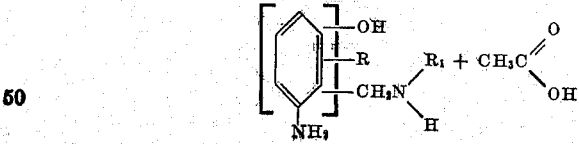

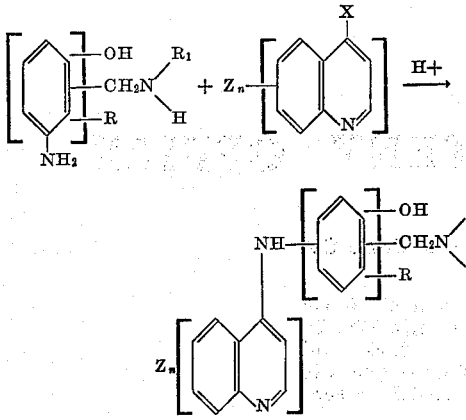

where Z, $n$, R, $R_1$ and X have the same significance as given above.

The invention is illustrated by the following examples.

*Example 1.*—*4 - (3' - ethylaminomethyl - 4' - hydroxyanilino) -7-chloroquinoline*

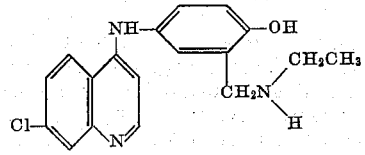

A mixture consisting of 18.5 g. of 2-ethylaminomethyl-4-aminophenol dihydrochloride and 15 g. of 4,7-dichloroquinoline in 100 cc. of methanol is refluxed for three hours. The reaction mixture is concentrated to one-half volume, cooled and the dihydrochloride salt of the desired 4-(3'-ethylaminomethyl-4'-hydroxyanilino) -7- chloroquinoline removed by filtration. The crude salt is purified by recrystallization from absolute ethanol; M. P. 280° C. dec.

*Example 2.*—*4-(3'-n-butylaminomethyl- 4' - hydroxyanilino) -7-chloroquinoline*

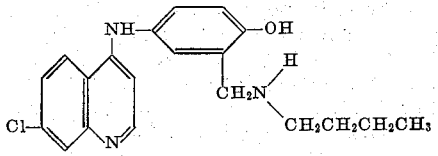

23.6 g. of 2-n-butylaminomethyl-4-acetylaminophenol is refluxed for one hour with 50 cc. of 6 N hydrochloric acid. The solution is cooled and the pH adjusted to about 4 by the addition of dilute sodium hydroxide solution. 19.5 g. of 4,7-dichloroquinoline is added and the mixture refluxed for one and a half hours. After cooling, the mixture is made just alkaline with sodium hydroxide solution, the precipitate base removed by filtration and washed with water and dried. The base is dissolved in methanol and an excess of alcoholic hydrogen chloride added. Acetone is added to precipitate the product, the product collected and purified by recrystallization from methanol-acetone mixture.

*Example 3.*—*4-(3'-n-amylaminomethyl- 4' - hydroxyanilino) -7-chloroquinoline*

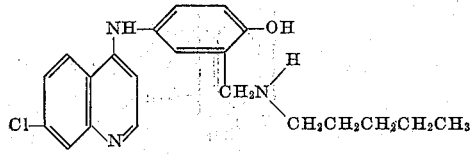

26.2 g. of 2-n-amylaminomethyl-4-acetylaminophenol is heated with 60 cc. of 6 N hydrochloric acid on a steam bath for one and a half hours. The solution is diluted with water and made just acid to Congo red by the addition of sodium hydroxide solution. 20.7 g. of 4,7-dichloroquinoline is added and the mixture refluxed for forty minutes. The yellow product starts to separate soon after refluxing is started. The mixture is treated with 2 or 3 cc. of concentrated hydrochloric acid and the mixture cooled. The solution is decanted from the crude solid dihydrochloride and the residue taken up in methanol. The solution is filtered, evaporated and the product precipitated by the addition of acetone. The pale yellow crystalline dihydrochloride is collected and purified further by recrystallization from ethanol; M. P. 266° C. dec.

*Example 4.*—*4-(3'-n-hexylaminomethyl-4' - hydroxyanilino) -7-chloroquinoline*

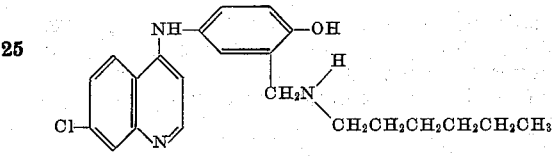

A mixture consisting of 52.5 g. of 2-n-hexylaminomethyl-4-acetylaminophenol, 35 cc. of concentrated hydrochloric acid and 50 cc. of alcohol is refluxed for one hour, cooled and the pH of the solution adjusted to about 4 by the addition of dilute sodium hydroxide solution. 39.4 g. of 4,7-dichloroquinoline is added, the mixture refluxed for two hours, cooled and the sodium chloride removed by filtration. Acetone is added to the filtrate, the crude dihydrochloride which separates collected and purified by recrystallization from methanol-ethanol mixture; M. P. 280° C. dec.

*Example 5.*—*4-(3'-n-heptylaminomethyl-4'- hydroxyanilino) -7-chloroquinoline*

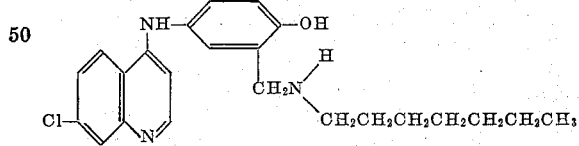

43 g. of 2-n-heptylaminomethyl-4-acetylaminophenol is refluxed with 100 cc. of 20% hydrochloric acid for one hour, cooled and the pH of the solution adjusted to about 4 by the addition of 40% sodium hydroxide solution. 30.8 g. of 4,7-dichloroquinoline and 200 cc. of dioxane are added and the mixture refluxed for three hours. The solution is cooled, made alkaline with ammonium hydroxide and diluted to a volume of one liter with water. The mixture is shaken with chloroform, the chloroform extract filtered, washed with water and the extract dried. The chloroform is distilled and the residue taken up in alcoholic hydrogen chloride. On the addition of ether to the hot solution the crude dihydrochloride of the product separates. The salt is collected, washed with ether and purified by recrystallization from 95% ethanol; M. P. 280° C. dec.

Example 6.—4-(3'-n-octylaminomethyl-4'-hydroxyanilino)-7-chloroquinoline

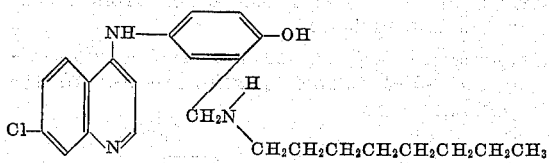

36.8 g. of 2-n-octylaminomethyl-4-acetylaminophenol is refluxed with 200 cc. of water and 25 cc. of concentrated hydrochloric acid for one hour, cooled and the solution made just acid to Congo red by the addition of sodium hydroxide solution. 24 g. of 4,7-dichloroquinoline is added, the mixture refluxed for one hour and cooled. The crude hydrochloride which separates is removed by filtration, washed with water and dissolved in ethanol. The alcoholic solution is filtered, evaporated and the product caused to crystallize by adding acetone. The crude dihydrochloride is separated and treated with an excess of dilute sodium hydroxide solution. The mixture is extracted with ether, the ether extract washed and the ether distilled. The residue which consists of the desired free base is purified by recrystallization from ethanol or from ethanol-ether mixture; M. P. 150° C.

Example 7.—4-(3'-α-methylallylaminomethyl-4'-hydroxyanilino)-7-chloroquinoline

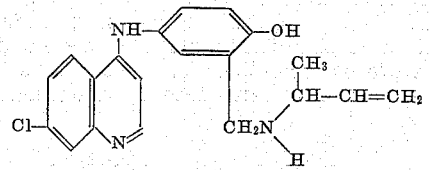

132.5 g. of 2-α-methylallylaminomethyl-4-acetylaminophenol is refluxed with 200 cc. of ethanol and 50 cc. of concentrated hydrochloric acid for one and a half hours. The pH of the solution is adjusted to about 4 by the addition of dilute sodium hydroxide solution. 110.8 g. of 4,7-dichloroquinoline is added, the mixture refluxed for two hours, cooled and the sodium chloride which separates removed by filtration. Acetone is added to the alcoholic filtrate and the crude dihydrochloride of the product which separates removed by filtration. The crude product is purified by recrystallization from methanol-ethanol mixture.

Example 8.—4-(3'-cyclohexylaminomethyl-4'-hydroxyanilino)-7-chloroquinoline

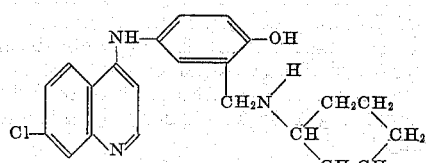

A mixture consisting of 106 g. of 2-cyclohexylaminomethyl-4-acetylaminophenol, 50 cc. of concentrated hydrochloric acid and 100 cc. of ethanol is refluxed for one hour, cooled and the pH of the solution adjusted to 4 by the addition of sodium hydroxide solution. 80.4 g. of 4,7-dichloroquinoline is added, the mixture refluxed for two hours, cooled and the sodium chloride removed by filtration. Acetone is added to the alcoholic filtrate, the crude dihydrochloride salt of the product collected and purified by recrystallization from methanol-ethanol mixture.

Example 9.—4-(3'-iso-butylaminomethyl-4'-hydroxyanilino)-7-chloroquinoline

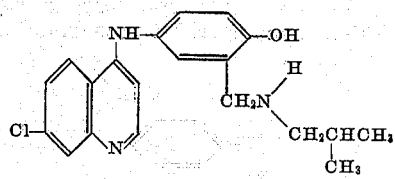

23.6 g. of 2-iso-butylaminomethyl-4-acetylaminophenol is refluxed for one hour with 50 cc. of 6 N hydrochloric acid. The solution is cooled and the pH adjusted to about 4 by the addition of dilute sodium hydroxide solution. 19.5 g. of 4,7-dichloroquinoline is added and the mixture refluxed for one and a half hours. After cooling, the mixture is made just alkaline with sodium hydroxide solution, the precipitated base removed by filtration and washed with water and dried. The base is dissolved in methanol and an excess of alcoholic hydrogen chloride added. Acetone is added to precipitate the product, the product collected and purified by recrystallization from methanol-acetone mixture.

Example 10.—3-methyl-4-(3'-n-heptylaminomethyl-4-hydroxyanilino)-7-chloroquinoline

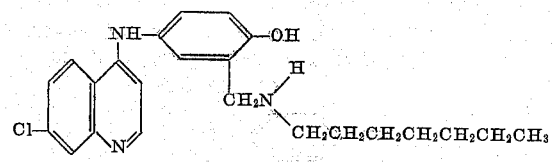

21 g. of 3-methyl-4,7-dichloroquinoline is added to a solution of 24 g. of 2-n-heptylaminomethyl-4-aminophenol in 75 cc. of water acidified to pH 4 by the addition of concentrated hydrochloric acid and the resulting mixture refluxed for one and a half hours. The mixture is cooled, made alkaline with dilute sodium hydroxide solution and extracted with ether. The ether extracts are washed with water, dried and treated with an excess of dry hydrogen bromide gas. The crude dihydrobromide salt which separates is collected and purified by recrystallization from ethanol-acetone mixture or from ethanol.

Example 11.—4-(2'-bromo-4'-ethylamino-5'-hydroxyanilino)-6,7-dimethylquinoline

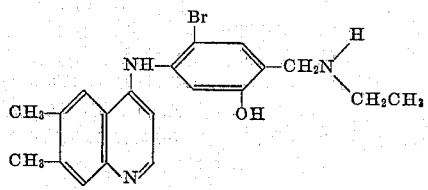

28 g. of 2-ethylamino-4-bromo-5-acetylaminophenol is refluxed with 70 cc. of 6 N hydrochloric acid for one hour, cooled and the pH of the solution adjusted to about 4 by the addition of dilute sodium hydroxide solution. 20 g. of 4-chloro-6,7-dimethylquinoline is added and the mixture refluxed for one and a half hours, cooled and the solution made just alkaline with dilute sodium hydroxide solution. The mixture is extracted with chloroform, the chloroform extract washed with water, dried and the chloroform distilled. The residue is taken up in a small amount of alcohol, treated with an excess of hydrogen chloride in alcohol and the dihydrochloride of the product precipitated by the addition of acetone. The crude dihydrochloride salt is collected and purified by recrystallization from methanol-acetone mixture.

*Example 12.—4-(2'-hydroxy-3'-ethylaminomethyl-5'-chloroanilino)7-bromoquinoline*

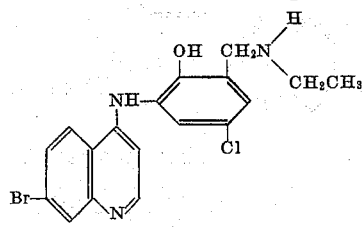

24 g. of 4-chloro-8-bromoquinoline is added to a solution of 20 g. of 2-ethylaminomethyl-4-chloro-6-aminophenol in 65 cc. of water acidified to pH 4 with hydrochloric acid and the mixture refluxed for one and a half hours. The mixture is cooled, made just alkaline with sodium hydroxide solution and extracted with chloroform. The chloroform extract is washed with water, dried and the chloroform distilled. The residue is taken up in methanol, the solution treated with an excess of dry hydrogen chloride in methanol and the crude dihydrochloride precipitated by the addition of acetone. The product is collected and purified by recrystallization from methanol-acetone mixture.

*Example 13.—4-(3'-n-butylaminomethyl-4'-hydroxy-5'-allylanilino)-7-hydroxyquinoline*

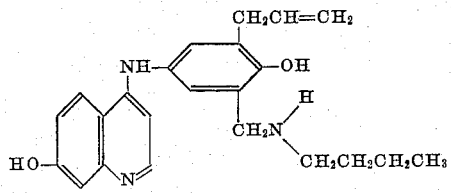

23.4 g. of 2-n-butylaminomethyl-4-amino-5-allylphenol dihydrochloride is added to a solution of 17.8 g. of 4-chloro-5-hydroxyquinoline dissolved in 200 cc. of n-propanol and the resulting mixture heated under reflux for two hours, cooled and the mixture treated with water. About 5 cc. of concentrated hydrochloric acid is added and the solution extracted exhaustively with ether. The ether extracts are discarded and the mixture made just alkaline with ammonium hydroxide solution. The alkaline solution is extracted with ether, the ether extract washed, dried and then treated with an excess of dry hydrogen chloride. The crude dihydrochloride which separates is collected and purified by recrystallization from methanol-acetone mixture.

*Example 14.—4-(2',4'-dihydroxy-5'-ethylaminomethylanilino)-5-chloro-8-methoxyquinoline*

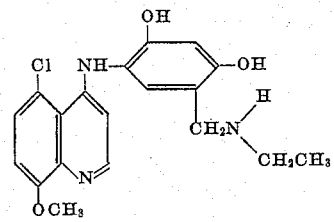

22.4 g. of 2,4-dihydroxy-5-ethylaminomethyl acetanilide is refluxed with 25 cc. of 6 N hydrochloric acid and 60 cc. of alcohol for one hour. The solution is cooled and the pH adjusted to about 4 by the addition of 30% sodium hydroxide solution. 22.5 g. of 4,5-dichloro-8-methoxyquinoline is added and the mixture refluxed for one and a half hours, cooled and the sodium chloride removed by filtration. Acetone is added to solution and the crude dihydrochloride salt which separates removed by filtration. The crude product is purified by recrystallization from methanol-acetone mixture.

*Example 15. — 3 - carboethoxy-4-(3'-methyl-4'-hydroxy-5'-aminomethylanilino) - 6-methoxyquinoline*

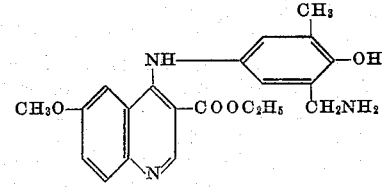

A mixture consisting of 22.5 g. of 2-aminomethyl-4-amino - 6 - methylphenol dihydrochloride and 26 g. of 3-carboethoxy-4-chloro-6-methoxyquinoline in 300 cc. of absolute ethanol is refluxed for two hours, cooled and the crude dihydrochloride of the product precipitated by the addition of acetone. The solid is collected and purified by recrystallization from ethanol-acetone mixture.

Attention is directed to our copending applications Serial No. 556,496, filed Sept. 29, 1944; Serial No. 576,900, filed Feb. 8, 1945; Serial No. 626,907, filed Nov. 5, 1945; and Serial No. 722,474, filed Jan. 16, 1947, wherein somewhat related quinoline compounds are described and claimed. Attention is also directed to our copending application Serial No. 626,906, filed Nov. 5, 1945, wherein certain quinoline compounds falling within the scope of the instant claims are claimed and an alternative process for preparing the compounds of the instant case is described and claimed.

What we claim as our invention is:

1. A compound of the class consisting of a free base and its acid addition salts, said free base having the formula,

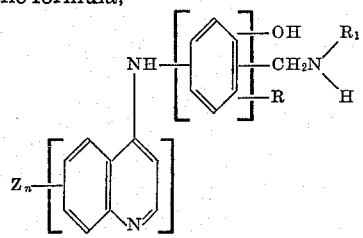

where Z is a member of the class consisting of hydrogen, halogen, —COO(lower alkyl), —OH, lower alkyl and lower alkoxy radicals, $n$ is one of the integers consisting of one and two, R is a member of the class consisting of hydrogen, halogen, —OH, lower alkenyl and lower alkyl radicals and $R_1$ is a member of the class consisting of hydrogen, cyclohexyl, alkyl radicals containing 1 to 10 carbon atoms inclusive and alkenyl radicals containing 1 to 10 carbon atoms inclusive, the group

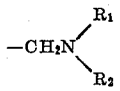

being attached to the aryl nucleus in one of the positions ortho and para to the hydroxyl group.

2. An acid addition salt of a compound having the formula,

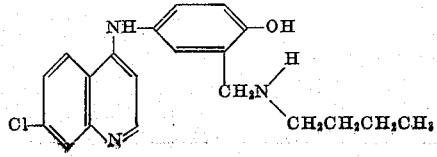

3. An acid addition salt of a compound having the formula,

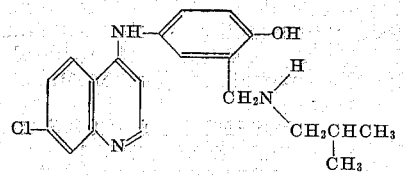

4. An acid addition salt of a compound having the formula,

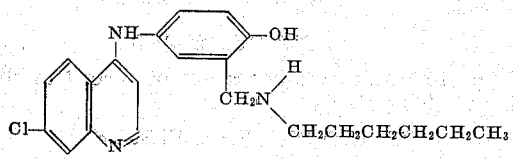

5. A compound of the formula,

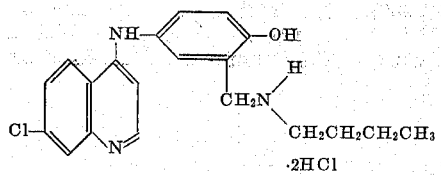

6. A compound of the formula,

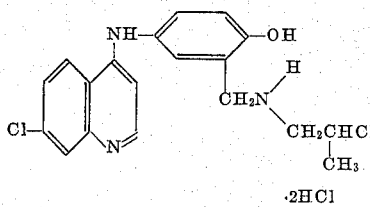

7. A compound of the formula,

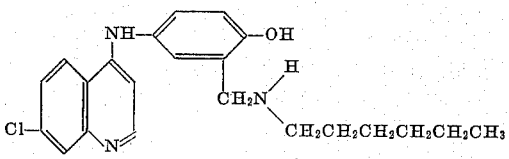

8. Process for obtaining a compound of the formula,

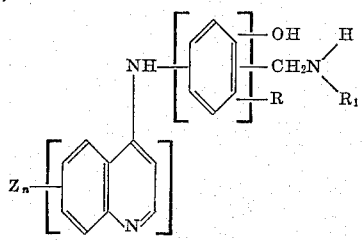

which comprises reacting a 4-haloquinoline compound of the formula,

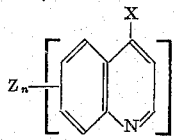

with a substituted aminophenol of the formula,

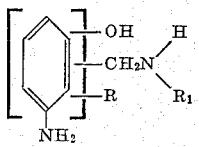

where X is a member of the class consisting of chlorine and bromine, Z is a member of the class consisting of hydrogen, halogen, —COO(lower alkyl), —OH, lower alkyl and lower alkoxy radicals, $n$ is one of the integers consisting of one and two, R is a member of the class consisting of hydrogen, halogen, —OH, lower alkenyl and lower alkyl radicals and $R_1$ is a member of the class consisting of hydrogen, cyclohexyl, alkyl radicals containing 1 to 10 carbon atoms inclusive and alkenyl radicals containing 1 to 10 carbon atoms inclusive, the group

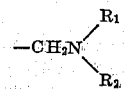

being attached to the aryl nucleus in one of the positions ortho and para to the hydroxyl group.

9. Process for obtaining a compound of the formula,

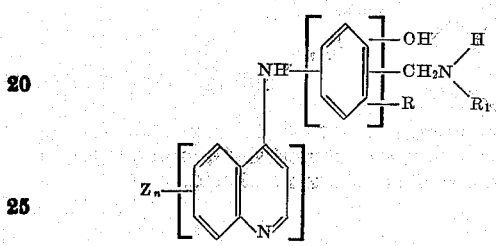

which comprises reacting a 4-haloquinoline compound of the formula,

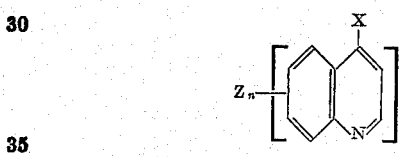

with a substituted aminophenol of the formula,

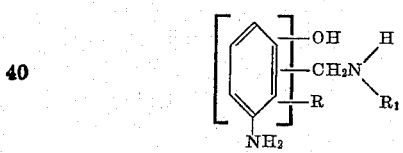

in the presence of an acid, where X is a member of the class consisting of chlorine and bromine, Z is a member of the class consisting of hydrogen, halogen, —COO(lower alkyl), lower alkyl and lower alkoxy, $n$ is one of the integers consisting of 1 and 2, R is a member of the class hydrogen, halogen, —OH, lower alkenyl and lower alkyl radicals and $R_1$ is a member of the class consisting of hydrogen, cyclohexyl, alkyl radicals containing 1 to 10 carbon atoms inclusive and alkenyl radicals containing 1 to 10 carbon atoms inclusive, the group

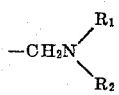

being attached to the aryl nucleus in one of the positions ortho and para to the hydroxyl group.

10. Process for obtaining a compound of the formula,

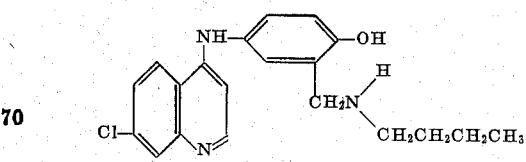

which comprises reacting 4,7-dichloroquinoline with 2-n-butylaminomethyl-4-aminophenol in the presence of a dilute mineral acid.

11. Process for obtaining a compound of the formula,

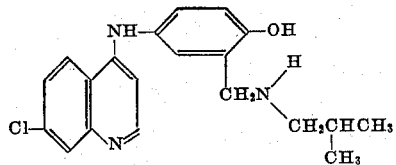

which comprises reacting 4,7-dichloroquinoline with 2-isobutylaminomethyl-4-aminophenol in the presence of a dilute mineral acid.

12. Process for obtaining a compound of the formula,

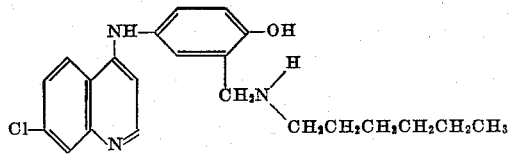

which comprises reacting 4,7-dichloroquinoline with 2-n-hexylaminomethyl-4-aminophenol in the presence of a dilute mineral acid.

13. A hydrohalide salt of 4-[3'-n-butylaminomethyl-4'-hydroxyanilino]-7-chloroquinoline.

14. A hydrohalide salt of 4-[3'-isobutylaminomethyl-4'-hydroxyanilino]-7-chloroquinoline.

15. A hydrohalide salt of 4-[3'-n-hexylaminomethyl-4'-hydroxyanilino]-7-chloroquinoline.

JOSEPH H. BURCKHALTER.
ELDON M. JONES.
ALBERT L. RAWLINS.
FRANK H. TENDICK.
WALTER F. HOLCOMB.

REFERENCES CITED

The following references are of record in the file of this patent:

UNITED STATES PATENTS

| Number | Name | Date |
|---|---|---|
| 1,891,980 | Hartman | Dec. 27, 1932 |
| 1,896,461 | Muth | Feb. 7, 1933 |
| 1,902,103 | Schonhofer | Mar. 21, 1933 |